United States Patent Office 3,314,809
Patented Apr. 18, 1967

3,314,809
PROCESS OF MAKING THERMOPLASTIC SHAPED ARTICLES FROM HYDROXYPROPYL CELLULOSE HAVING AN M.S. OF AT LEAST 2
Eugene D. Klug, Wilmington, Del., assignor to Hercules Incorporated, Wilmington, Del., a corporation of Delaware
No Drawing. Filed Feb. 8, 1963, Ser. No. 257,062
6 Claims. (Cl. 106—197)

The present invention relates to a process of making thermoplastic articles and particularly to such a process wherein the thermoplastic material used is a particular and novel hydroxypropyl cellulose. If the desired article and use to be made of it are such as to make it desirable to have an extremely high degree of thermoplasticity, somewhat better results are obtained if the hydroxypropyl cellulose is mixed with a plasticizer.

Thus, in accordance with the present invention it has been found that excellent articles of any desired shape are obtained by forming under heat and pressure a particular and novel hydroxypropyl cellulose, said hyydroxypropyl cellulose having excellent thermoplasticity, an M.S. of at least 2 and being soluble in cold water. The hydroxypropyl cellulose is also well adapted to forming heat-sealable thermoplastic articles, e.g. free films, coatings, capsules, etc.

The novel hydroxypropyl cellulose product used in the present invention and the novel process of making said product are described and claimed in copending application Ser. No. 257,064, entitled, Hydroxypropyl Cellulose and Process, filed on even date herewith in the name of Eugene D. Klug as inventor.

The purpose of the following three paragraphs is to explain the use herein and in the prior art of the term "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydrolucose unit. For the alkyl, carboxyalkyl, or acyl derivatives of cellulose, the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

When a mixed ether is involved herein, the first value given is the D.S. and the second value given is the M.S. For example, regarding methyl hydroxypropyl cellulose in Table 1, the first value given is the methyl D.S. and the second value given is the hydroxypropyl M.S.

The two most widely used methods for determining M.S. are the Zeisel-Morgan method and the terminal methyl method. The Zeisel-Morgan method is reported beginning at page 500, vol. 18, 1946, of Industrial and Engineering Chemistry, Analytical Edition. The terminal methyl method is reported by Lemieux and Purves beginning at page 485, vol. 25B, 1947, of Canadian Journal of Research. Some are of the opinion that perhaps the latter method is somewhat more accurate. However all those skilled in the art realize that it is quite difficult to obtain a high degree of accuracy in determining M.S. at high M.S. levels, and that the accuracy of neither of these methods is as high as desired. All of the M.S. values given herein were determined by the terminal methyl method. This explanation is being given in order to make it clear that although the M.S. values herein may not be highly accurate, they were determined by the most accurate method known.

The following examples illustrate the present invention, but they are not intended to limit the present invention beyond the scope of the appended claims. In the examples and elsewhere herein percent and parts are by weight unless otherwise indicated. All viscosities given herein were determined with a standard Brookfield Synchro-Lectric LVF viscometer using an aqueous solution of the cellulose ethers of the concentration specified and at a temperature of 25° C.

EXAMPLE 1

*Plastic flow*

The plastic flow properties of the hydroxypropyl cellulose products of the present invention and of prior art materials were determined under the application of heat and pressure in an Olsen Bakelite flow tester. This is a standard testing device widely used in the plastics industry. It is described in ASTM method D569–46A (ASTM Standards, 1958, Part 9, page 393). This device is perhaps more often referred to in the art as the Tinius Olsen flow tester.

For these plastic flow tests the cellulose ether was fused into a plastic mass by heat and pressure. This mass was ground to a fine powder and conditioned at 25° C. and 50% R.H. for about 24 hours. Cylindrical pellets ⅜" x ⅜" were formed from this powder in a pelleting machine. The pellets were placed in the Tinius Olsen flow tester and the plastic flow thereof measured under the conditions shown in Table 1 hereinafter.

TABLE 1

| Cellulose Ethers | D.S. | M.S. | Viscosity | | Extrusion | | Flow In./2 mins. |
|---|---|---|---|---|---|---|---|
| | | | Conc., Percent | Cps. | Temp., °C. | Pressure, p.s.i. | |
| Hydroxypropyl cellulose | | 3.50 | 2 | 1,800 | 130 | 500 | .84 |
| | | | | | 150 | 500 | 3.8 |
| Methyl hydroxypropyl cellulose | 1.76 | .16 | 2 | 400 | 150 | 500 | .03 |
| | | | | | 160 | 500 | .06 |
| Hydroxypropyl cellulose | | 3.31 | 2 | 100 | 140 | 500 | .7 |
| | | | | | 150 | 500 | 1.28 |
| Methyl hydroxypropyl cellulose | 1.70 | .20 | 2 | 50 | 150 | 500 | .12 |
| | | | | | 170 | 500 | .65 |

As will be seen from Table 1 hereinbefore, the hydroxypropyl cellulose products employed in making thermoplastic heat-sealable articles in accordance with the present invention exhibited far better plastic flow properties than the prior art methy hydroxypropyl cellulose, which is a commercially available water soluble ether.

An attempt was also made to determine the plastic flow properties of commercially available hydroxyethyl cellulose (2.50 M.S. and substantially the same viscosities as the hydroxypropyl cellulose products in Table 1) using the same flow conditions in Table 1, but this was unsuccessful. The hydroxyethyl cellulose came out of the orifice in the form of crumbs, i.e. it did not weld or fuse together. In order to obtain plastic flow in the sense the term is used in the art and in the present application, the material being tested must weld; that is, the material must flow from the orifice of the extruder as a continuous article, e.g. a continuous film if that is the article being extruded.

EXAMPLES 2–5

Thermoplastic articles

It has been found that the unusual properties of the novel hydroxypropyl cellulose products used in the present invention render them quite satisfactory as raw materials for the preparation of thermoplastic and heat-sealable articles.

The hydroxypropyl cellulose products of the present invention may be compression molded, injection molded, or extrusion molded into thermoplastic heat-sealable articles of any desired shape either with or without the use of a plasticizer. The following Examples 2–5 illustrate these uses.

EXAMPLE 2

Compression molding without plasticizer

Clear, transparent and flexible hydroxypropyl cellulose films 3–5 mils thick were prepared, without the use of a plasticizer, by compression molding for 4 minutes at 180° C. and 250 p.s.i.g. The hydroxypropyl cellulose used had an M.S. of 327 and a 2% aqueous viscosity of 1800 cps.

EXAMPLE 3

Compression molding with plasticizer

Example 2 was repeated except that 0.1 part of dipropylene glycol per part of the hydroxypropyl cellulose was used as plasticizer. The hydroxypropyl cellulose used had an M.S. of 3.08 and a 2% aqueous viscosity of 87 cps. As in Example 2 above, the film thus produced was clear, transparent and flexible.

EXAMPLE 4

Injection molding with plasticizer 1 part hydroxypropyl cellulose was stirred in 10.5 parts hexane, and 0.2 part propylene glycol was added slowly to the slurry. As the propylene glycol was absorbed, the hydroxypropyl cellulose became swollen and then agglomerated. The hexane was filtered off and the filter cake was dried at room temperature and conditioned at 50% relative humidity and 25° C. Then the filter cake was worked on a two-roll mill at 110° C. The resulting thermoplastic sheet 3–5 mils thick was stripped from the rolls at 95° C. and cut up into small pieces which were injection molded at 140° C. using a Forhring Mini-jector. The final strip product was clear, transparent, flexible and readily dissolved in tap water.

EXAMPLE 5

Extrusion molding without plasticizer

The hydroxypropyl cellulose product of Example 2 above was made into a rod by extruding at 140° C. through a 1-inch National Rubber Machinery extruder fitted with a 1/8" diameter circular orifice. The extruded rod has excellent tensile strength, was free of discoloration, and readily dissolved in tap water giving a 2% aqueous viscosity of 1630 cps. The resistance of the hydroxypropyl cellulose product to viscosity decrease under these conditions is considered excellent, since it only dropped from 1800 cps. before extruding to 1630 cps. after extruding and since it is well known in the art that extrusion molding of thermoplastic articles causes a decrease in viscosity.

As those skilled in the art will appreciate, many variations may be made in the above conditions within the scope of the present invention defined in the appended claims.

As pointed out hereinbefore, it is preferable to use a plasticizer in admixture with the hydroxypropyl cellulose where the desired article and use to be made of said article are such as to make it desirable to have an extremely high degree of thermoplasticity with a low M.S. hydroxypropyl cellulose, but the use of a plasticizer is not necessary. If a plasticizer is desirable, the art is well aware of many such suitable plasticizers. Typical examples of suitable plasticizers include the glycols, e.g. propylene glycol, di- and tripropylene glycol; dimethyl phthalate; trimethylolpropane; lanolin; glycerol and its esters such as e.g. mono-, di-, and triacetin; hydroxyalkyl glycerol; sorbitol. The amount of plasticizer, based on the weight of the hydroxypropyl cellulose, may vary from 0%–20% but preferably will be 2%–10%. Although greater amounts of plasticizer can be used, no advantage is gained by doing so. Thus, as compared with prior art materials much less plasticizer is used in the present invention.

Generally the amount of hydroxypropyl cellulose will be about 90%–100%, by weight of the total mixture to be formed into the thermoplastic article. The minimum M.S. of the hydroxypropyl cellulose is critical and must be at least 2, preferably 3–10, 3–4 being specifically preferred for most uses. Although there is no maximum M.S. from a theoretical standpoint, as the M.S. increases above about 10 the hydroxypropyl cellulose is too soft for practical use, i.e. for most uses.

The temperatures and pressures used in forming the shaped articles vary inversely, i.e. the higher the temperature the lower the pressure, and conversely. Temperatures and pressures may vary over a very wide range. For instance, temperatures of 80° C.–250° C. and pressures of about 50–25,000 p.s.i. are applicable in making the numerous articles in accordance with the present invention. For most articles contemplated, generally temperatures of 100° C.–180° C. and pressures of 750–1800 p.s.i. are satisfactory. Of course, as is well known in the art, temperature and pressure conditions will also vary with the type molding being used. Broadly, then, applicable temperature and pressure conditions may range from those at which the material being formed flows adequately to just short of those conditions at which said material is adversely affected, e.g. as by being undesirably deformed or decomposed.

Viscosity of the hydroxypropyl cellulose is not a limiting factor. While low viscosity hydroxypropyl cellulose flows somewhat more easily, high viscosity hydroxypropyl cellulose is applicable. Generally the viscosity of the hydroxypropyl cellulose will range from a 5% viscosity of about 25 cps. to a 1% viscosity of about 3000 cps., however any viscosity desired may be used.

The hydroxypropyl cellulose used in the present invention has excellent thermoplastic and water-solubility properties. The M.S. of the hydroxypropyl cellulose has an important influence on these properties. The thermoplasticity of the hydroxypropyl cellulose varies directly with M.S., i.e. the higher the M.S. the higher the thermoplasticity, and conversely. The thermoplasticity varies inversely with viscosity, i.e. the higher the viscosity the lower the thermoplasticity, and conversely. The temperature at which the hydroxypropyl cellulose becomes insoluble in water varies inversely with M.S. For instance the hydroxypropyl cellulose of M.S. 2 does not become insoluble in water until the water reaches a temperature of about 60° C., whereas the hydroxypropyl cellulose of M.S. 4 becomes insoluble in water when the water reaches a temperature of about 40° C. Stated in another way, the hydroxypropyl cellulose of M.S. 2 is soluble in water up to a temperature of about 60° C. but insoluble in water above a temperature of about 60° C. whereas the hydroxypropyl cellulose of M.S. 4 is soluble in water up to a temperature of about 40° C. but insoluble in water above a temperature of about 40° C. Thus, the M.S. desired will depend on the particular articles to be made from the hydroxypropyl cellulose and also on the uses to be made of the articles. In some cases, hydroxypropyl cellulose of relatively low M.S. is more desirable, whereas in other cases hydroxypropyl cellulose of higher M.S. is preferred.

The present invention is applicable to making articles of any desired shape, typical examples being films, sheets, tubes, rods, capsules (e.g. capsules for drugs and foods), coatings (e.g. coatings for paper, fabrics and plastics).

If desired, various other materials may be used in combination with the hydroxypropyl cellulose or with the hydroxypropyl cellulose and plasticizer, e.g. anti-oxidants, fillers, pigments, and the like.

A process of preparing the novel hydroxypropyl cellulose compound used in the present invention will now be given. In this process parts and percent are by weight. A slurry of 1 part finely cut wood pulp in 10 parts tertiary butanol, 1.3 parts water and 0.2 part of 50% aqueous solution of NaOH is stirred for one hour at 20° C. The slurry is prepared by adding the NaOH to a mixture of the pulp, tertiary butanol and water while stirring. Then the excess liquid is filtered off by means of suction, leaving a filter cake weighing 3.2 parts. This alkali cellulose filter cake is broken up and added to a pressure vessel along with 7.8 parts hexane and 2.55 parts propylene oxide and heated for 16 hours at 70° C. while tumbling the vessel end over end. The hydroxypropyl cellulose product is a solid suspended in the hexane. The excess hexane is filtered off and the filter case is added to vigorously boiling water, the residual hexane and tertiary butanol flashing off. The slurry is kept acidic to phenolphthalein by addition of 85% $H_3PO_4$ in small amounts as needed. The pH of the slurry is finally adjusted to 7.0, the product washed substantially free of salt impurities with hot water (85° C.–95° C.), the water decanted and the product dried at 130° C. using a two-roll drum drier. At room temperature the resulting product has excellent solubility in water. Its MS. is 3.26, which corresponds to a propylene oxide etherification efficiency of 43.5%. The Brookfield viscosity of a 2% aqueous solution of the hydroxypropyl cellulose product at 25° C. is 47 cps.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of preparing articles of manufacture of any desired shape which comprises subjecting hydroxypropyl cellulose to a temperature of about 80° C.–250° C. and a pressure of about 50–25,000 pounds per square inch, said hydroxypropyl cellulose being characterized by: having a high degree of thermoplasticity and an M.S. of at least 2, being soluble in cold water and polar organic solvents and insoluble in hot water.

2. Process of preparing heat-sealable articles of manufacture of any desired shape which process comprises subjecting hydroxypropyl cellulose to a temperature of about 100° C.–180° C. and a pressure of about 750–1800 pounds per square inch, said hydroxypropyl cellulose being characterized by: having a high degree of thermoplasticity and an M.S. of at least 2, being soluble in cold water and polar organic solvents and insoluble in hot water.

3. Process of claim 1 wherein the M.S. of said hydroxypropyl cellulose is 3–10.

4. Process of claim 1 wherein the M.S. of said hydroxypropyl cellulose is 3–4.

5. Process of preparing articles of manufacture of any desired shape which process comprises subjecting a mixture of hydroxypropyl cellulose and plasticizer therefor to a temperature of about 80° C.–250° C. and a pressure of about 50–25,000 pounds per square inch, said hydroxypropyl cellulose being characterized by: having a high degree of thermoplasticity and an M.S. of at least 2, being soluble in cold water and polar organic solvents and insoluble in hot water.

6. Process of claim 5 wherein said plasticizer is a glycol in an amount of about 2%–10% by weight of said hydroxypropyl cellulose.

References Cited by the Examiner

UNITED STATES PATENTS

| | | | |
|---|---|---|---|
| 2,602,755 | 7/1952 | Silvernail | 167—83 XR |
| 2,771,377 | 11/1956 | Greminger et al. | 106—197 XR |
| 2,810,659 | 10/1957 | Greminger et al. | 106—197 XR |
| 2,836,505 | 5/1958 | Kropscott et al. | 106—197 XR |
| 2,836,506 | 5/1958 | Silvernail | 106—197 XR |
| 2,840,485 | 6/1958 | Greminger et al. | 106—197 XR |

FOREIGN PATENTS

| | | |
|---|---|---|
| 344,528 | 2/1931 | Great Britain. |
| 840,872 | 7/1960 | Great Britain. |

OTHER REFERENCES

"Cellulose and Cellulose Derivatives, Part II," High Polymer, vol. V, 2nd. ed., Interscience, 1954, Ott et al. (pp. 900, 905, and 946).

ALEXANDER H. BRODMERKEL, *Primary Examiner.*

J. H. WOO, *Assistant Examiner.*